United States Patent [19]
Craig

[11] 3,713,720
[45] Jan. 30, 1973

[54] MICROSCOPIC OPTICAL COMPARISON DEVICE

[75] Inventor: Dwin R. Craig, Gaithersburg, Md.

[73] Assignee: Symbionics, Inc., Annapolis, Md.

[22] Filed: Sept. 14, 1970

[21] Appl. No.: 71,641

Related U.S. Application Data

[63] Continuation-in-part of Ser. No. 803,250, Feb. 28, 1969, abandoned.

[52] U.S. Cl. ................................. 350/30, 356/168
[51] Int. Cl. ............................................. G02b 21/20
[58] Field of Search ........ 350/30, 141, 275; 356/168, 356/162, 163, 156, 164, 165

[56] References Cited

UNITED STATES PATENTS

| | | | |
|---|---|---|---|
| 3,203,308 | 8/1965 | Brigham et al. | 350/30 X |
| 3,415,998 | 12/1968 | Crockett et al. | 350/275 X |
| 3,328,109 | 6/1967 | Seedhouse | 350/36 |

OTHER PUBLICATIONS

Pope et al., Article in Review of Scientific Instruments Vol. 37 No. 3 Mar. 1966 pgs. 377 & 378

*Primary Examiner*—David H. Rubin
*Attorney*—Birch, Swindler, McKie & Beckett

[57] ABSTRACT

A microscopic optical comparison device in which objects to be compared are arranged in side by side relation and when viewed through a binocular microscope system are caused to appear as one object with each object being viewed by a respective one of the observers eyes. The objects are intermittently and successively illuminated from a substantially point source of light which is intercepted by a rotating shutter to first block the light from one of the objects following which it blocks the light from the other object. Differences in the objects being compared appear as pulses of the missing detail of the object.

4 Claims, 3 Drawing Figures

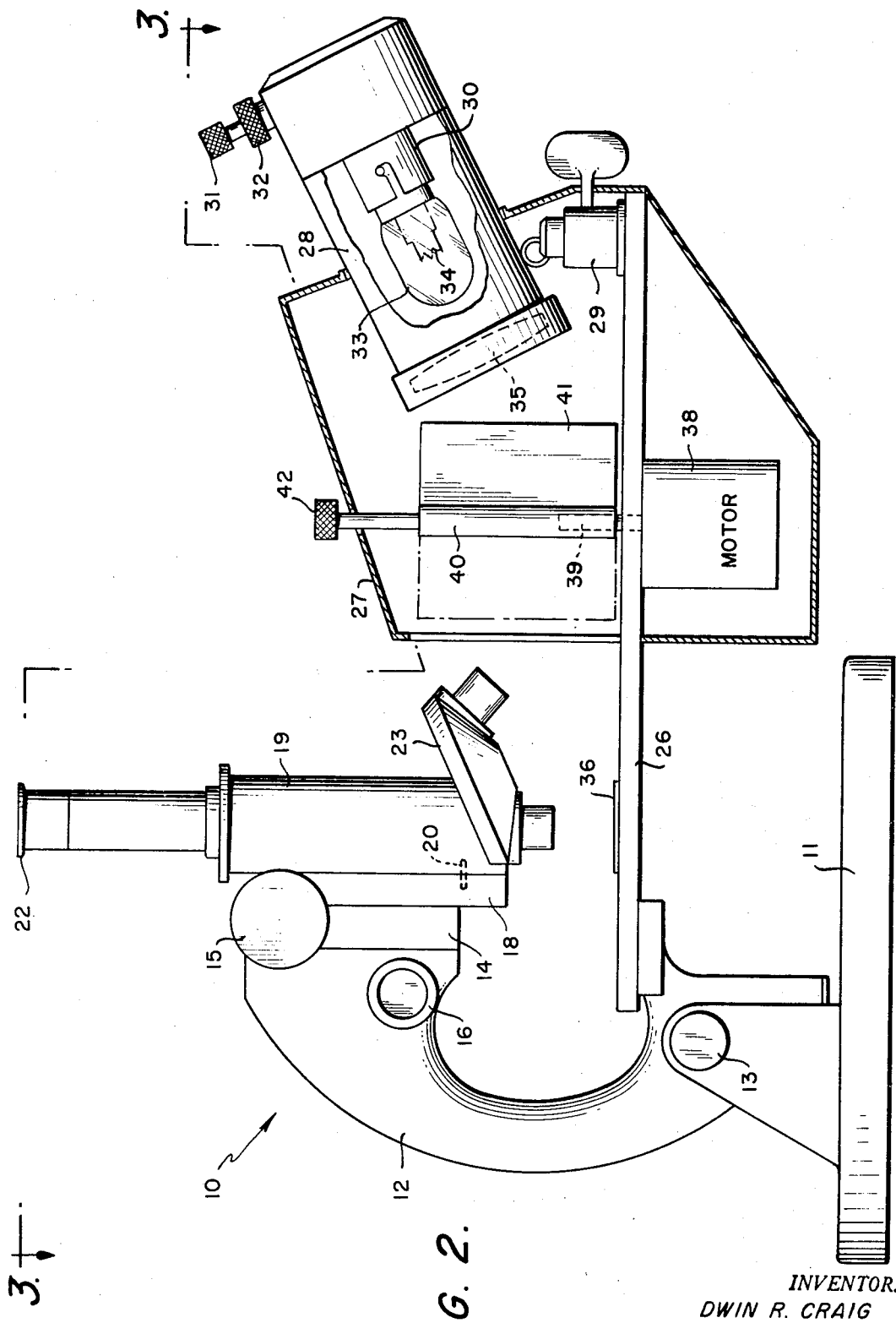

MICROSCOPIC OPTICAL COMPARISON DEVICE

CROSS REFERENCE TO RELATED APPLICATIONS

The present invention is a continuation-in-part of my co-pending application Ser. No. 803,250 filed Feb. 28, 1969 now abandoned, on an "Optical Comparison Device".

BACKGROUND OF THE INVENTION

1. Field of the Invention

The invention relates to the microscopic optical comparison of two objects, photographs, drawings and the like, wherein one of the objects is compared to a standard object to determine if any differences exist between the objects being compared with the difference being identifiable by observation.

2. Description of the Prior Art

In prior art microscopic optical comparison devices such as the Patent to Wilkinson 2,674,152 a single object is viewed by both eyes of the observer and compared to side by side positioned stereo pictures of a standard specimen with no superimposition taking place. Wilkinson provides no means for causing a flicker when differences exist between the standard object and the object compared therewith.

Other prior art microscopic optical comparison devices superimpose the images into a single eye piece to be viewed by one eye of the observer. When viewed through a beam splitter system and a single eye piece the two objects must be exactly placed in perfect geometric alignment to produce a fused image. Minute registration differences within the objects will produce a flicker that confuses the observer looking for real differences.

SUMMARY OF THE INVENTION

The present invention is directed to a microscopic optical comparison device in which a standard object is arranged in side by side relation to an object to be compared to the standard with the two objects being separately viewed through the side by side microscopes of a binocular microscope system. The microscopes are adjusted so that the two images from the two objects are fused by the observers brain, into a single image. A point source of light illuminates the objects and a revolving shutter intermittantly and alternately interrupts the light from the point source of light to the two objects so that differences between the standard and the object being compared to the standard will appear as pulsations in the fused image.

BRIEF DESCRIPTION OF THE DRAWINGS

FIG. 2 is a side elevation of the invention shown partially broken away and in section for convenience of illustration.

DESCRIPTION OF THE PREFERRED EMBODIMENT

Figure 1:
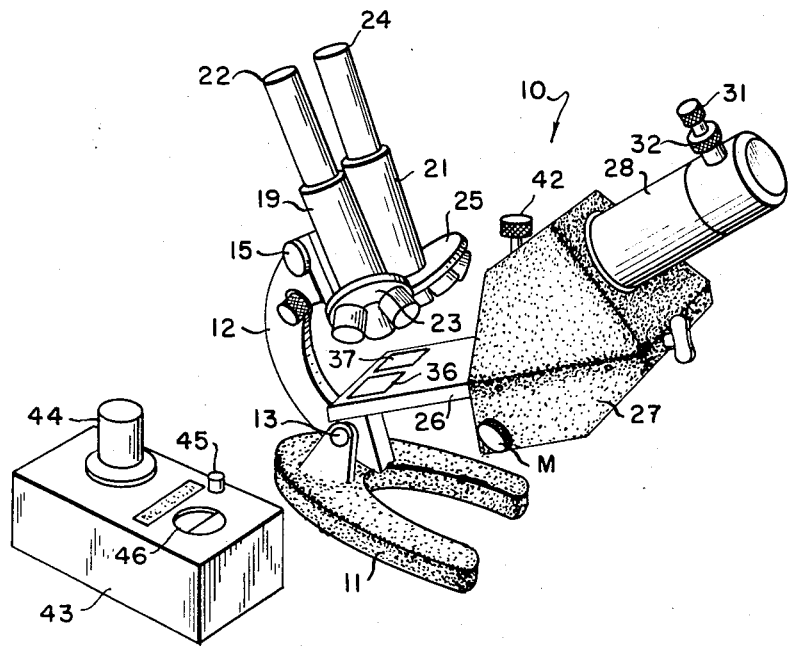
FIG. 1 is a perspective view of the invention.

Referring now to the drawings in detail wherein like reference characters indicate like parts throughout the several figures the reference numeral 10 indicates generally a microscopic optical comparison device constructed in accordance with the invention.

The optical comparison device 10 includes a base 11 having a microscope mount 12 secured thereto by a horizontal pivot 13. The microscope mount 12 has a block 14 secured thereon for vertical adjustment by means of hand wheels 15, 16 in a conventional manner. A pair of plates 17, 18 are rigidly secured to the block 14 in spaced apart parallel relation.

A conventional microscope barrel 19 is secured to the plate 18 by means of a horizontal friction pivot 20 to permit the barrel 19 to be angularly adjusted with respect to the vertical. A second conventional microscope barrel 21 is similarly secured to the plate 17. The microscope barrel 19 includes an eye piece 22 and turret lenses 23 to form a complete microscope. The microscope barrel 21 includes an eye piece 24 and a turret lens system 25 to form a complete microscope.

A generally rectangular platform 26 is secured to the mount 12 and extends generally perpendicularly to a plane extending through the axes of the barrels 19, 21. A housing 27 is secured to the platform 26 at the end thereof opposite the barrels 19, 21.

A projection lamp barrel 28 is supported on an adjustable support 29 carried by the platform 26 with the barrel 28 extending through the rear of the housing 27. The projection lamp barrel 28 has a projection lamp socket 30 mounted therein for adjustment generally horizontally and vertically within the barrel 28. Adjustment screws 31, 32 are provided for moving the socket 30 in a conventional manner. A light bulb 33 is mounted in the base 30 within the barrel 28 and has a filament 34 which approximates a point source of light. A lens 35 is mounted in the inner end of the barrel 28 to direct the light from the bulb 33 on the objects 36, 37 mounted on the platform 26. The lens 35 may be focused in a conventional manner by a hand control (not shown) to provide the desired light.

Figure 3:
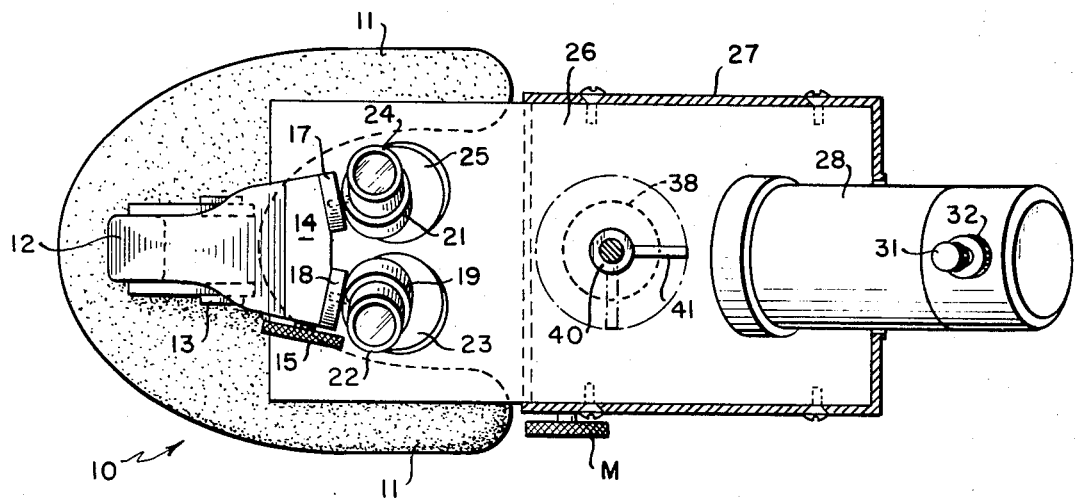
FIG. 3 is a horizontal sectional view taken along the line 3—3 of FIG. 2 looking in the direction of the arrows.

An upright electric motor 38 is mounted beneath the platform 26 in the housing 27 and has a shaft 39 extending upwardly through the platform 26 carrying a shaft 40 on its upper end. The shaft 40 carries a generally rectangular single vane shutter 41 which is rotated by the electric motor 38, the speed of which is conventionally adjustable by manual control M. The shaft 40 projects through the top of the housing 27 and has a hand control knob 42 on its upper end to permit the shutter vane 41 to be moved to the position illustrated in FIG. 3.

A lamp control box 43 contains a transformer (not shown) and a lamp voltage controller 44. A volt meter 46 indicates the voltage across the lamp 33. The switch 45 is provided for bypassing the controller to provide momentary maximum brightness to the lamp 33.

In the operation of the microscopic optical comparison device 10 an object 36 is positioned beneath the barrel 19 and a object 37 is positioned beneath the barrel 21. The barrels 19, 21 are angularly adjusted until the eye pieces 22, 24 are spaced properly for the two eyes of the observer. The objects 36, 37 are then positioned so that they fuse into a single object when viewed through the eye pieces 22, 24. The light 33 is on during the adjusting of the objects 36, 37 and the shutter vane 41 is manually positioned by knob 42 to the position illustrated in FIGS. 2 and 3 so that both object 36 and object 37 are fully illuminated. After the objects 36, 37 have been properly positioned the light is adjusted until the desired lighting of the objects 36, 37 is obtained. The object 36 or the object 37 will be a standard object and the remaining object will be one that is being checked against the standard.

The motor 38 is then energized and permitted to rotate at a relatively slow speed, on the order of 50 RPM, so that the vane 41 first interrupts the light passing to the object 36, then permits light to pass to both objects, then interrupts the light to object 37, and then again permits light to reach both object 36 and object 37. As the vane 41 continues to rotate any differences existing between object 36 and object 37 will appear and disappear in a pulsing action, such as to draw the attention of the observer thereto, immediately, when viewing the objects 36, 37. The intermittant simultaneous lighting of both objects during a small portion of each cycle permits the brain to retain the fusing of the images.

Having thus described the preferred embodiment of the invention it should be understood that numerous structural modifications and adaptations may be resorted to without departing from the spirit of the invention.

What is claimed is:

1. A binocular microscopic optical comparison device including first and second microscopes mounted inside by side relation, platform means for supporting first and second objects in spaced apart aligned relation, said first microscope providing a view of only said first object, said second microscope providing a view of only said second object, said first and second microscopes having respective eyepieces spaced for binocular viewing by an observer, whereby the two views are fused by the observer's brain into a single image, illuminating means aligned with said platform means for illuminating said first and second objects, and a single vane cyclically driven shutter positioned between said illuminating means and said platform means, said shutter having its axis of rotation positioned centrally of the light beam from said illuminating means, so that on each cycle of rotation the light to the first object is obstructed, then both objects are illuminated, and then the light to the second object is obstructed, the simultaneous viewing of both objects during portions of each cycle enabling the observer's brain to maintain image fusion while still detecting differences between the two objects by pulsations of the fused image.

2. A comparison device as claimed in claim 1, wherein the axis of rotation of said shutter is at right angles to the path of the light beam from said illuminating means.

3. A comparison device as claimed in claim 2, wherein said shutter is substantially rectangular.

4. A device as claimed in claim 3 wherein an electric motor drives said shutter and means are provided for varying the speed of said electric motor.

* * * * *